(12) United States Patent
Chen et al.

(10) Patent No.: US 11,940,879 B2
(45) Date of Patent: Mar. 26, 2024

(54) DATA PROTECTION METHOD, ELECTRONIC DEVICE AND COMPUTER PROGRAM PRODUCT

(71) Applicant: EMC IP Holding Company LLC, Hopkinton, MA (US)

(72) Inventors: Qiang Chen, Shanghai (CN); Jing Yu, Shanghai (CN); Jiayang Xu, Shanghai (CN); Danqing Sha, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 283 days.

(21) Appl. No.: 17/060,040

(22) Filed: Sep. 30, 2020

(65) Prior Publication Data
US 2022/0043714 A1    Feb. 10, 2022

(30) Foreign Application Priority Data
Aug. 7, 2020  (CN) .......................... 202010787827.7

(51) Int. Cl.
*G06F 11/14*    (2006.01)
*G06N 20/00*    (2019.01)

(52) U.S. Cl.
CPC ......... *G06F 11/1451* (2013.01); *G06N 20/00* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,918,359 | B2* | 12/2014 | Ahuja | H04L 63/20 707/607 |
| 10,872,099 | B1* | 12/2020 | Gharpure | G06F 16/27 |
| 2016/0364573 | A1* | 12/2016 | Chan | G06F 21/6218 |
| 2020/0387618 | A1* | 12/2020 | Karatzoglou | G06F 21/604 |
| 2021/0049421 | A1* | 2/2021 | Tandecki | G06F 16/221 |
| 2021/0173952 | A1* | 6/2021 | Raphael | G06F 21/6218 |
| 2021/0256396 | A1* | 8/2021 | Meier | G06N 5/01 |
| 2021/0334277 | A1* | 10/2021 | Thai | G06F 7/14 |

* cited by examiner

*Primary Examiner* — Richard L Bowen
(74) *Attorney, Agent, or Firm* — Chamberlain, Hrdlicka, White, Williams & Aughtry; Aly Z. Dossa

(57) ABSTRACT

Embodiments of the present disclosure provide a data protection method, an electronic device, and a computer program product. The method includes determining an object feature for each protection object in a set of protection objects that generate protected data, the set of protection objects including at least one protection object configured with a predetermined data protection strategy. The method further includes determining a set of candidate objects belonging to the same class as the at least one protection object from the set of protection objects according to the determined object features. The method further includes configuring the predetermined data protection strategy to at least one candidate object in the set of candidate objects.

4 Claims, 5 Drawing Sheets

DATA PROTECTION METHOD, ELECTRONIC DEVICE AND COMPUTER PROGRAM PRODUCT

CROSS-REFERENCE TO RELATED APPLICATIONS

This application claims priority to Chinese Patent Application No. 202010787827.7 filed on Aug. 7, 2020. Chinese Patent Application No. 202010787827.7 is hereby incorporated by reference in its entirety.

TECHNICAL FIELD

Embodiments of the present disclosure relate to the technical field of data storage, and more particularly, to a data protection method, an electronic device, and a computer program product.

BACKGROUND

Data protection refers to backing up data of users to prevent data loss caused by failures. In order to back up data, users often need to set up a series of backup and recovery strategies for different types of data according to different business areas, policies and regulations, or personal preferences. These strategies are collectively referred to as data protection strategies. A data protection strategy may specify the frequency and time range for backup or recovery, and may also be used to define the granularity of backups, such as incremental backup or full backup. Current backup systems usually provide users with interactive strategy creation tools to view, filter, and organize data that needs to be protected according to different data protection strategies.

SUMMARY OF THE INVENTION

The embodiments of the present disclosure provide a data protection scheme.

In a first aspect of the present disclosure, a data protection method is provided. The method includes determining an object feature for each protection object in a set of protection objects that generate protected data, the set of protection objects including at least one protection object configured with a predetermined data protection strategy. The method further includes determining a set of candidate objects belonging to the same class as the at least one protection object from the set of protection objects according to the determined object features. The method further includes configuring the predetermined data protection strategy to at least one candidate object in the set of candidate objects.

In a second aspect of the present disclosure, an electronic device is provided. The electronic device includes a processor and a memory that is coupled to the processor and has instructions stored therein. The instructions, when executed by the processor, cause the device to execute actions. The actions include determining an object feature for each protection object in a set of protection objects that generate protected data, the set of protection objects including at least one protection object configured with a predetermined data protection strategy. The actions further include determining a set of candidate objects belonging to the same class as the at least one protection object from the set of protection objects according to the determined object features. The actions further include configuring the predetermined data protection strategy to at least one candidate object in the set of candidate objects.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The summary part is provided to introduce the selection of concepts in a simplified form, which will be further described in the Detailed Description below. The summary part is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components. In the accompanying drawings.

DETAILED DESCRIPTION

Figure 1:
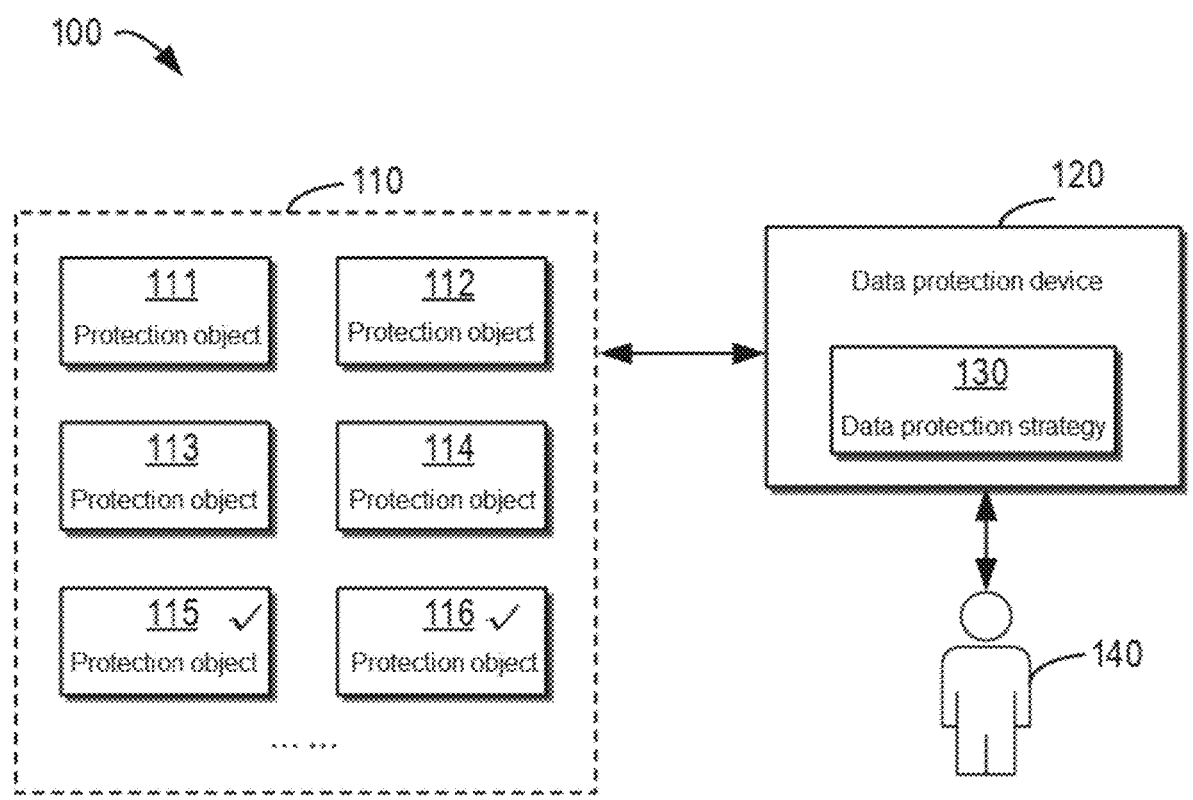
FIG. 1 shows a schematic diagram of an example environment where an embodiment of the present disclosure may be implemented.

The principles of the present disclosure will be described below with reference to some example embodiments shown in the accompanying drawings. Although preferred embodiments of the present disclosure are shown in the accompanying drawings, it should be understood that these embodiments are described merely to enable those skilled in the art to better understand and then implement the present disclosure, and do not limit the scope of the present disclosure in any way.

The term "including" and variants thereof used herein indicate open-ended inclusion, that is, "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned previously, different data protection strategies may be used to protect different types of data. Herein, a source that generates protected data is referred to as an asset or protection object, sometimes it is simply referred to as an "object." A data protection system may be configured to protect objects that generate different types of data, such as virtual machines, file systems, databases, and physical devices.

In current data protection systems, users usually need to view, filter, and organize objects to be protected according to different data protection strategies. This process mainly depends on names or labels of protection objects. However, when there are a large number of protection objects, this process may be very cumbersome and time-consuming, and it is easy to omit protection objects with similar features.

First, it is difficult to name each protection object correctly. An organization (for example, a company) that needs data protection usually already has a large number of protection objects, and the number of protection objects from different aspects of a business has been growing rapidly. For example, if the organization opens a new site, there will be a new protection object that generates a large amount of new data at the site. It is not easy to manage names of all these protection objects. Although there are appropriate rules and guidelines for naming protection objects, there may still be omissions and violations.

In addition, it is difficult to correctly mark each protection object. When creating protection objects for the first time or manually classifying the protection objects later, the protection objects may be marked with similar features. However, this greatly requires and relies on manpower.

In addition, not all protection objects can be easily identified by names or marks. For example, a protection object such as a physical host may have a host name, but the host name may be arbitrary and has no meaning for classification. Therefore, the inventor of the present application realizes that classification can be performed by detecting attributes or behaviors exposed by the protection objects, such as detection ports and application programming interfaces (APIs).

In view of the above, when there are a large number of protection objects to be classified and organized into different data protection strategies, many factors need to be considered in terms of protection objects and data protection strategies. It would be beneficial to help users find out objects that might be protected by the same data protection strategy.

Since the data protection strategy is very subjective and variable for different organizations, it is difficult to formulate rules with broad adaptability. Therefore, it is more reasonable to start with one or more protection objects that have been configured with a data protection strategy (for example, selected by a user), and then use features of all protection objects to detect similar protection objects.

A data protection scheme is proposed in the embodiments of the present disclosure to solve the above problem and one or more of other potential problems. In the scheme, an object feature is determined for each protection object in a set of protection objects. The object feature may include feature items of multiple dimensions or levels. The set of protection objects includes at least one protection object configured with a predetermined data protection strategy. For example, the at least one protection object is selected by a user to be added to the predetermined data protection strategy. Then, a set of candidate objects belonging to the same class as the at least one protection object are determined from the protection object according to the determined object features. The set of candidate objects are potential objects that may or are expected to be protected according to the predetermined data protection strategy. The set of candidate objects may be determined using a classification model. Next, the predetermined data protection strategy is configured to at least one candidate object in the set of candidate objects. For example, the set of candidate objects may be presented to a user, and to which candidate object or objects the predetermined data protection strategy is configured may be determined according to a user selection.

In the proposed scheme, based on the features of a large number of protection objects and the protection object that has been configured with a predetermined data protection strategy, potential objects that may or are expected to be protected according to the predetermined protection strategy may be automatically determined. In this way, potential objects that are expected to be protected according to a predetermined data protection strategy can be quickly identified from a large number of protection objects, thereby facilitating the realization of efficient data protection. Optionally, a candidate object may be recommended to a user to assist the user in selecting objects that are desired to be protected according to a predetermined data protection strategy from a large number of protection objects. In this way, a data protection strategy can be efficiently created, and user experience can be improved.

Basic principles and several example implementations of the present disclosure are illustrated below with reference to FIG. 1 to FIG. 5. It should be understood that these example embodiments are provided only to enable those skilled in the art to better understand and then implement the embodiments of the present disclosure, and not to limit the scope of the present disclosure in any way.

FIG. 1 shows a block diagram of example environment 100 where an embodiment of the present disclosure can be implemented. As shown in FIG. 1, environment 100 includes a set of protection objects 110 and data protection device 120. In some embodiments, the set of protection objects 110 and data protection device 120 may be arranged together to jointly form a data protection system. In some embodiments, the set of protection objects 110 may be arranged separately from data protection device 120, but they may communicate with each other. In some embodiments, environment 100 may further include user 140 who can interact with data protection device 120 to manage operations such as backup and recovery of the set of protection objects 110. It should be understood that the structure and function of environment 100 are described for illustrative purpose only and do not imply any limitation to the scope of the present disclosure. For example, the embodiments of the present disclosure may also be applied to an environment different from environment 100.

The set of protection objects 110 include a plurality of protection objects that generate protected data. FIG. 1 schematically shows protection objects 111, 112, 113, 114, 115, 116, etc. The set of protection objects 110 may include assets such as virtual machines, file systems, databases (for example, structured query language (SQL) databases), physical devices, or machines. In some embodiments, protection objects in the set of protection objects 110 may be protection objects of the same type. For example, protection objects 111, 112, 113, 114, 115, and 116 may all be virtual machines. In some embodiments, protection objects in the set of protection objects 110 may be protection objects of different types. For example, some of protection objects 111, 112, 113, 114, 115, and 116 may be virtual machines, and the others may be file systems.

Data protection device 120 may include any suitable data protection product that provides data backup and/or data recovery services. One or more data protection strategies may be created and maintained at data protection device 120. Data protection strategy 130 is shown in FIG. 1, which is also referred to herein as a predetermined data protection strategy.

Data protection device 120 may interact with user 140. User 140 desires to protect and manage the set of protection objects 110 through data protection device 120. For example, user 140 may desire to add one or more protection objects in the set of protection objects 110 to data protection strategy 130. That is, user 140 may desire that one or more protection objects in the set of protection objects 110 are configured with data protection strategy 130, so that the one or more protection objects can be protected according to data protection strategy 130.

As shown in FIG. 1, protection objects 115 and 116 are configured with data protection strategy 130. For example, user 140 may choose to add protection objects 115 and 116 to data protection strategy 130. For another example, protection objects 115 and 116 may be assets that are already owned by the user and are protected by data protection strategy 130, while protection objects 111-114 may be newly added assets. Protection objects such as protection objects 115 and 116 that have been configured with data protection strategy 130 are also referred hereinafter to as "selected objects." Protection objects such as protection objects 111-114 that have not been configured with data protection strategy 130 are also referred hereinafter to as "unselected objects." In this case, data protection device 120 may determine candidate objects that user 140 may desire to protect according to data protection strategy 130 based on the features of the set of protection objects 110 and the selected objects. Data protection device 120 may then provide object recommendations to user 140 for user 140 to select from the candidate objects.

It should be understood that environment 100 shown in FIG. 1 is merely illustrative and not intended to be limiting. For example, the set of protection objects 110 may include more or fewer protection objects. For another example, a plurality of data protection strategies may be created and maintained at data protection device 120, and the scheme according to the present disclosure may be applied for each data protection strategy.

Figure 2:
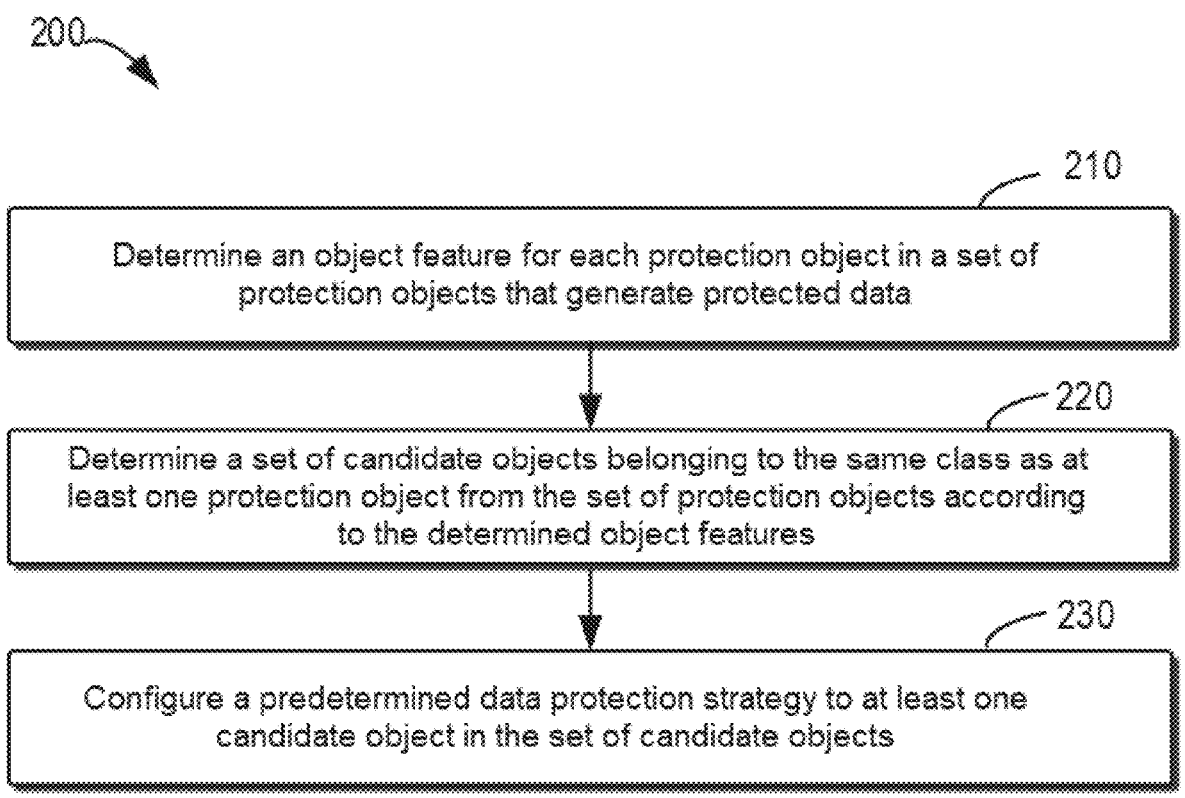
FIG. 2 shows a flowchart of an example method for data protection according to an embodiment of the present disclosure.

FIG. 2 shows a flowchart of example method 200 for data protection according to an embodiment of the present disclosure. Method 200 may be performed, for example, by data protection device 120 shown in FIG. 1. It should be understood that method 200 may also include additional actions not shown and/or omit actions shown, and the scope of the present disclosure is not limited in this regard. Method 200 is described in detail below with reference to FIG. 1.

At block 210, data protection device 120 determines an object feature for each protection object in a set of protection objects 110 that generate protected data. The set of protection objects 110 includes at least one protection object configured with data protection strategy 130, which is also referred to as a selected object, such as protection objects 115 and 116 shown in FIG. 1.

In some embodiments, data protection device 120 may generate and store an object feature of each protection object, and then add a protection object selected by user 140 to data protection strategy 130 based on a received user selection. That is, data protection device 120 may configure data protection strategy 130 to the protection object selected by user 140. In other embodiments, selected objects such as protection objects 115 and 116 may have been protected for a period of time according to data protection strategy 130. In response to a new protection object (for example, one or more of protection objects 111-114) being added to the set of protection objects 110, data protection device 120 may determine an object feature of each protection object.

The object feature may include attributes of the protection object in one or more dimensions, which may also be referred to as a set of attributes or object attributes. Alternatively or additionally, the object feature may include features determined based on object attributes, and such features are also referred to as implicit features. Such an embodiment will be described in detail below with reference to FIG. 3.

At block 220, data protection device 120 determines, according to the determined object features, a set of candidate objects belonging to the same class as the selected objects (for example, protection objects 115 and 116), which may also be referred to as candidate objects, from the set of protection objects 110. The determined candidate objects may be potential objects desired to be protected according to data protection strategy 130.

Any suitable classification model may be used to determine the candidate objects from the set of protection objects 110. The classification model is trained to identify a protection object with a similarity between the protection object and the selected object exceeding a threshold similarity according to the object features as belonging to the same class as the selected object.

In some embodiments, the classification model may be a one-class model, such as a single-class support vector machine. It is understandable that the number of selected objects in the set of protection objects 110 may be much smaller than the number of unselected objects. The single-class model is particularly suitable for dealing with such problems that the number of samples of one type is much smaller than the number of samples of another type. In such an embodiment, the single-class model may be trained based on a corresponding object feature of the selected object.

The single-class model learns from training data that contains only one "class" and tries to find a "tightest" boundary to describe the given training data. In the embodiment according to the present disclosure, the training data is the selected object, specifically the object feature of the selected object, and its "class" indicates that they will all be added to data protection strategy 130 or, in other words, configured with data protection strategy 130. What tries to be learned by using the single-class model is whether other protection objects should be configured with data protection strategy 130, for example, whether user 140 desires to add other protection objects to data protection strategy 130. If the trained single-class model identifies one or more unselected objects as belonging to the same class as the selected object, the one or more unselected objects may be determined as candidate objects.

In some embodiments, as more protection objects are selected by user 140 to be added to data protection strategy 130, the single-class model may be updated iteratively. In this way, the updated single-class model can more accurately determine candidate objects. In some embodiments, the single-class model may be improved to make the improved single-class model more suitable for the problem of determining candidate objects based on selected objects. For example, in the improved single-class model, the threshold similarity may be determined based on the object feature of the selected object. The threshold similarity may change as the number of selected objects increases. The single-class model will be described in detail below with reference to FIGS. 3 and 4.

At block 230, data protection device 120 configures data protection strategy 130 to at least one candidate object in the set of candidate objects 110. For example, data protection device 120 may add at least one candidate object to data protection strategy 130.

In some embodiments, data protection device 120 may provide user 140 with the set of candidate objects 110 and receive a user selection. Data protection device 120 may then configure data protection strategy 130 to the candidate object selected by user 140. For example, if protection object 111 is determined as a candidate object and user 140 selects protection object 111, protection object 111 will be added to data protection strategy 130. It is understandable that in the subsequent process, protection object 111 will be the selected object.

In some embodiments, data protection device 120 may rank the determined set of candidate objects, and configure data protection strategy 130 to at least one candidate object based on the ranked set of candidate objects. For example, the ranked set of candidate objects may be provided to user 140, and the candidate object selected by user 140 may be added to data protection strategy 130. For another example, candidate objects with a relatively high ranking may be added to data protection strategy 130. The candidate objects determined using a classification model such as a single-class model are only potential objects desired to be protected according to data protection strategy 130. Therefore, by ranking the candidate objects, the candidate objects may provide more meaningful and useful information. For example, the user may be provided with more meaningful and useful recommendations about candidate objects.

The ranking of the set of candidate objects may be based on any suitable method. The object feature of the protection object may include a plurality of feature items, which may form a feature space. In some embodiments, the ranking may be based on the similarity between candidate objects and selected objects. The candidate object that has a higher degree of similarity with the selected object may have a higher ranking. As an example, a distance (for example, an average distance) between the candidate object and the selected object in the feature space may be calculated as the similarity based on the corresponding object features of the candidate object and the selected object.

In some embodiments, at least one feature item may be selected from these feature items. The selected at least one feature item may be referred to herein as a top feature or an important feature item. The important feature item may be used to distinguish selected objects from unselected objects. For example, compared with an unselected feature item, the important feature item can better distinguish the selected objects from the unselected objects. Then, the set of candidate objects may be ranked according to the important feature item. The ranked candidate objects may be, for example, provided to user 140 for selection.

As an example, another classification model (for example, a two-class model) may be trained using selected objects and unselected objects in the set of protection objects 110 to distinguish the selected objects from the unselected objects. The purpose of training the classification model is to determine the relative importance of a plurality of feature items included in the object feature. One or more feature items with relatively high weights in the trained classification model may be determined as important feature items. For example, the important feature items may have a weight higher than a threshold.

Next, a distance between each candidate object and a selected object (for example, protection objects 115 and 116) may be calculated in a feature space composed of the important feature items, and the set of candidate objects may be ranked based on the calculated distance. The calculated distance may be an average distance between the corresponding candidate object and the selected object, or may be the shortest distance between the corresponding candidate object and the selected object. The embodiments of the present disclosure are not limited in this respect. If a certain candidate object is very similar to the selected object, the calculated distance of the candidate object will be relatively small and will have a relatively high ranking.

The ranked candidate objects may be provided to user 140. In this way, time and experience spent by user 140 in selecting from candidate objects can be saved. The efficiency of configuring data protection strategies can be further improved, and the user experience can be improved.

Figure 3:
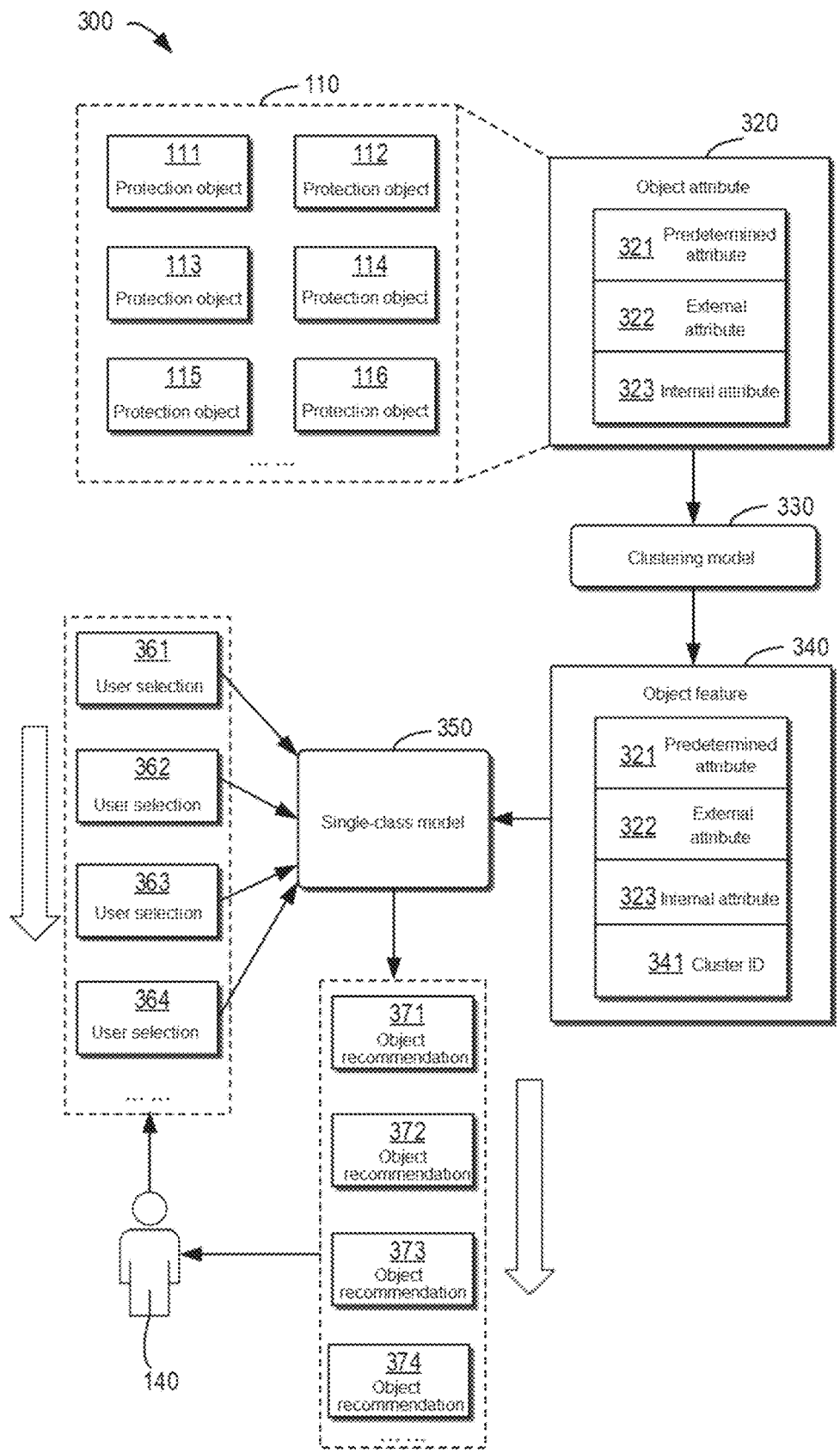
FIG. 3 shows a schematic diagram of a process of recommending a protection object to a user according to some embodiments of the present disclosure.

FIG. 3 shows a schematic diagram of process 300 of recommending a protection object to user 140 according to some embodiments of the present disclosure. Process 300 may be regarded as a specific implementation of the data protection scheme according to the embodiment of the present disclosure. Data protection device 120 may determine object attribute 320 for each protection object in a set of protection objects 110.

In some embodiments, object attribute 320 may include multiple levels of attributes. As shown in FIG. 3, object attribute 320 may include predetermined attribute 321, external attribute 322, and internal attribute 323. The multi-level attribute may describe the characteristics of the protection object as much as possible, so as to facilitate the accurate determination of candidate objects from the set of protection objects 110.

Predetermined attribute 321 may be one or more attributes defined by the user or configured in other ways. For example, predetermined attribute 321 may include the name of a protection object, a mark added by the user, and a system configuration. The system configuration may include the type of an operating system (OS) of the protection object, the number of storage devices (for example, hard disks), the size of storage devices, the number of processing units (for example, a central processing unit (CPU) or a graphics processing unit (GPU)), a memory size, and the like.

External attribute 322 refers to an attribute monitored from the outside of the protection object. For example, external attribute 322 of the protection object may be detected by monitoring the protection object from the outside of the OS. External attribute 322 may also be referred to as a black box attribute. External attribute 322 may include a usage mode (for example, a CPU mode) of the processing unit by the protection object, an input/output (I/O) of the storage device, a network status, and the like. The network status may include, for example, a port used for data input, the size of a data packet (for example, an average size), the sequence of sizes of data packets, a changed part, an unchanged part, a port used for data output, an address, and the like.

Internal attribute 323 refers to an attribute monitored inside the protection object. For example, internal attribute 323 of the protection target may be detected by logging into the OS of the protection target. Internal attribute 323 may also be referred to as a white box attribute. Internal attribute 323 may include information such as a thread name, a file name, and a registry.

As shown in FIG. 3, data protection device 120 may cluster the set of protection objects 110 based on object attribute 320 of each protection object in the set of protection objects 110. Through clustering, at least one cluster-based class may be obtained for each protection object, which may be represented, for example, by a cluster identifier (ID). The resulting class may be considered as an implicit feature of the protection object. Any suitable clustering algorithm, such as K-means, may be used for clustering.

In some embodiments, object attributes at each level may be clustered respectively. In this type of embodiments, classes in three dimensions may be obtained for each protection object. For example, clustering may be performed based on predetermined attributes 321 of protection objects to obtain a first class; clustering may be performed based on external attributes 322 of the protection objects to obtain a second class; and clustering may be performed based on internal attributes 323 of the protection objects to obtain a third class. In some embodiments, predetermined attribute 321, external attribute 322, and internal attribute 323 may be fused for clustering. In this embodiment, a class may be obtained for each protection object.

Next, data protection device 120 may determine object feature 340 of each protection object based on object attribute 320 and a result of the clustering. Object feature 340 may include one or more classes obtained by clustering, for example, cluster ID 341. Object feature 340 may also include all or part of predetermined attribute 321, external attribute 322, and internal attribute 323. Alternatively, one or more classes obtained through clustering may also be used as an item of external attribute 322.

In such an embodiment, by taking the class obtained by clustering as at least part of the object feature, the implicit characteristics of the protection object may be characterized, and such implicit characteristics may not be reflected by intuitive and direct attributes. In this way, it helps to more accurately identify candidate objects from unselected objects.

In other embodiments, the set of protection objects 110 may not be clustered, but the processed (for example, normalized) object attribute 320 may be directly used as the object feature.

Figure 4:
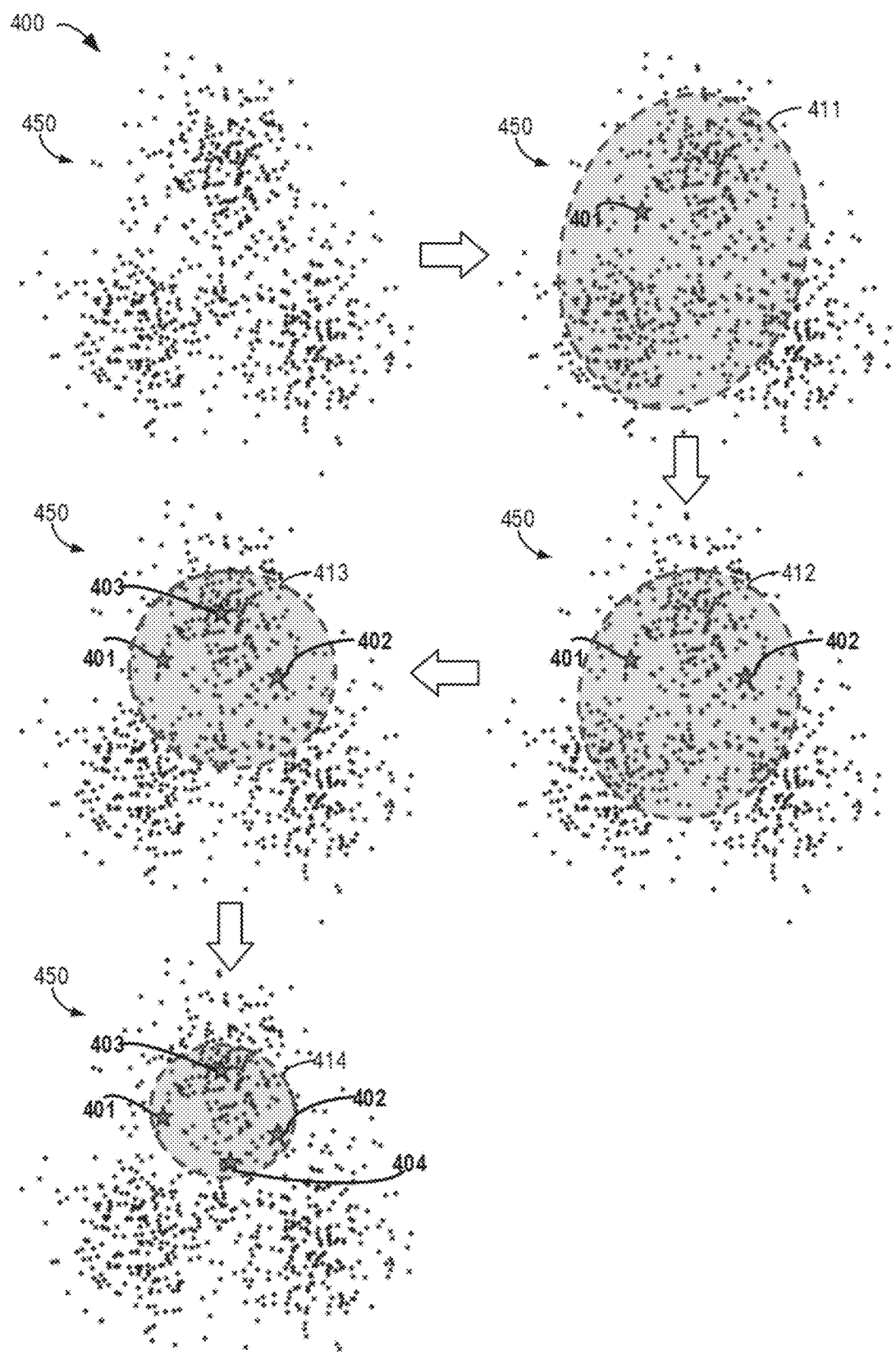
FIG. 4 shows a schematic diagram of a process of determining a candidate object according to some embodiments of the present disclosure.

As mentioned above, object feature 340 may include a plurality of feature items. The plurality of feature items may include all or part of predetermined attribute 321, external attribute 322, and internal attribute 323, and the class obtained by clustering. These feature items may form a feature space. FIG. 4 shows schematic diagram 400 of a process of determining a candidate object according to some embodiments of the present disclosure. FIG. 4 shows feature space 450, where each point represents a corresponding protection object, for example, protection objects 111-116 shown in FIG. 1 and the like. It should be understood that the position of the point representing the protection object in feature space 450 depends on object feature 340 of the corresponding protection object. The following describes an example process of using a single-class model to recommend protection objects to user 140 for data protection strategy 130 with reference to FIGS. 3 and 4.

Data protection device 120 may receive user selection 361 from user 140. For example, user selection 361 may indicate that user 140 chooses to add protection object 401 shown in FIG. 4 to data protection strategy 130. FIG. 4 shows a selected object in an enlarged star pattern. Single-class model 350 is trained based on the selected protection object 401 to determine boundary 411 in feature space 450. Protection objects located within boundary 411 in feature space 450 belong to the same class as protection object 401. Therefore, the protection objects within boundary 411 are determined as candidate objects.

Data protection device 120 may rank the thus determined candidate objects, as described above. Data protection device 120 may then provide the ranked candidate objects as object recommendation 371 to user 140, for example, present object recommendation 371 on a display device.

User 140 may provide further user selection 362 to data protection device 120 based on object recommendation 371. User selection 362 may indicate that user 140 chooses to add one or more candidate objects in object recommendation 371 to data protection strategy 130. For example, as shown in FIG. 4, user selection 362 indicates that protection object 402 is selected.

Data protection device 120 may update single-class model 350 based on the newly selected protection object 402. In the updated single-class model 350, boundary 411 is updated to boundary 412. Furthermore, protection objects within boundary 412 are determined as candidate objects. Data protection device 120 may provide the ranked candidate objects as object recommendation 372 to user 140.

User 140 may provide data protection device 120 with further user selection 363 based on object recommendation 372. User selection 363 may indicate that user 140 chooses to add one or more candidate objects in object recommendation 372 to data protection strategy 130. For example, as shown in FIG. 4, user selection 363 indicates that protection object 403 is selected.

Data protection device 120 may further update single-class model 350 based on the newly selected protection object 403. In this way, boundary 412 is updated to boundary 413. Furthermore, protection objects within the boundary 413 are determined as candidate objects. Data protection device 120 may further provide the ranked candidate objects as object recommendation 373 to user 140.

User 140 may provide data protection device 120 with further user selection 364 based on object recommendation 373. User selection 364 may indicate that user 140 chooses to add one or more candidate objects in object recommendation 373 to data protection strategy 130. For example, as shown in FIG. 4, user selection 364 indicates that protection object 404 is selected.

Data protection device 120 may further update single-class model 350 based on the newly selected protection object 404. In this way, boundary 413 is updated to boundary 414. Furthermore, the protection objects within the boundary 414 are determined as candidate objects. Data protection device 120 may further provide the ranked candidate objects as object recommendation 374 to user 140.

In the example process described in conjunction with FIGS. 3 and 4, as the user selections increase, single-class model 350 is updated iteratively. In this way, protection objects may be more accurately recommended to users.

As previously mentioned, in some embodiments, the single-class model may be improved to make the improved single-class model more suitable for the problem of determining candidate objects based on selected objects. The single-class model solves the problem that there are only positive labels. However, this also brings another problem: when there is less training data, the learned boundary is smaller, and when there is more training data, the learned boundary is larger. The characteristic of the single-class model violates the intention and requirements of protection object recommendation, because the recommended or determined candidate object should have a higher degree of confidence when there are more user selections. That is, when there are more user selections, the uncertainty is smaller.

In order to overcome this problem, a dynamic uncertainty is proposed here, which matches a currently selected object. More specifically, the uncertainty of single-class model predictions may be allocated according to an average distance of the selected object in feature space 450.

Initially, there may only be a few selected objects. The average distance at this moment is relatively large. Correspondingly, the allocated uncertainty is also very large, which means that a protection object far away from the selected object in feature space 450 may also be determined as a candidate object. For example, in this case, the threshold similarity mentioned above may be small, so that a protection object that is not so similar to the selected object may also be determined as a candidate object. Referring to FIG. 4, boundary 411 defines a relatively large range in feature space 450.

As more protection objects are added to data protection strategy 130, for example, user 140 selects more protection objects, the average distance between the selected objects may become smaller. In this case, the single-class model has a relatively small uncertainty, and the single-class model tends to determine the protection object closer to the selected object as a candidate object, which, for example, is recommended to user 140. In this case, the threshold similarity mentioned above may be increased accordingly, so that those protection objects that are relatively similar to the selected object may be determined as candidate objects. For example, in FIG. 4, a range defined by boundaries 411, 412, 413, and 414 gradually becomes smaller.

In this embodiment, the dynamic uncertainty related to the similarity between the selected objects is utilized. The uncertainty of the single-class model for determining candidate objects may be gradually reduced. In this way, when there are fewer selected objects, it is possible to avoid omitting the protection objects that should be recommended; and when there are more selected objects, more accurate protection object recommendations can be achieved.

The data protection scheme according to the present disclosure will be described below through a specific example. For example, a company maintains a plurality of data centers in different geographic locations and is running thousands of virtual machines. In the prior art, it takes a lot of manpower and time to mark the virtual machines according to different data protection strategy requirements.

It is assumed that the company wants to back up virtual machines with SQL databases according to different geographic locations. An administrator selects virtual machines with an SQL database and CentOS at location A. At this moment, it is impossible to determine which feature or features are important. Therefore, the virtual machine with CentOS and the virtual machine with the SQL database may be recommended.

Then, the administrator selects another virtual machine having Windows as the OS and also having the SQL database. Next, according to the scheme of the present disclosure, it can be detected that the SQL database is a feature with relatively high priority, and the recommendation can be adjusted accordingly.

Figure 5:
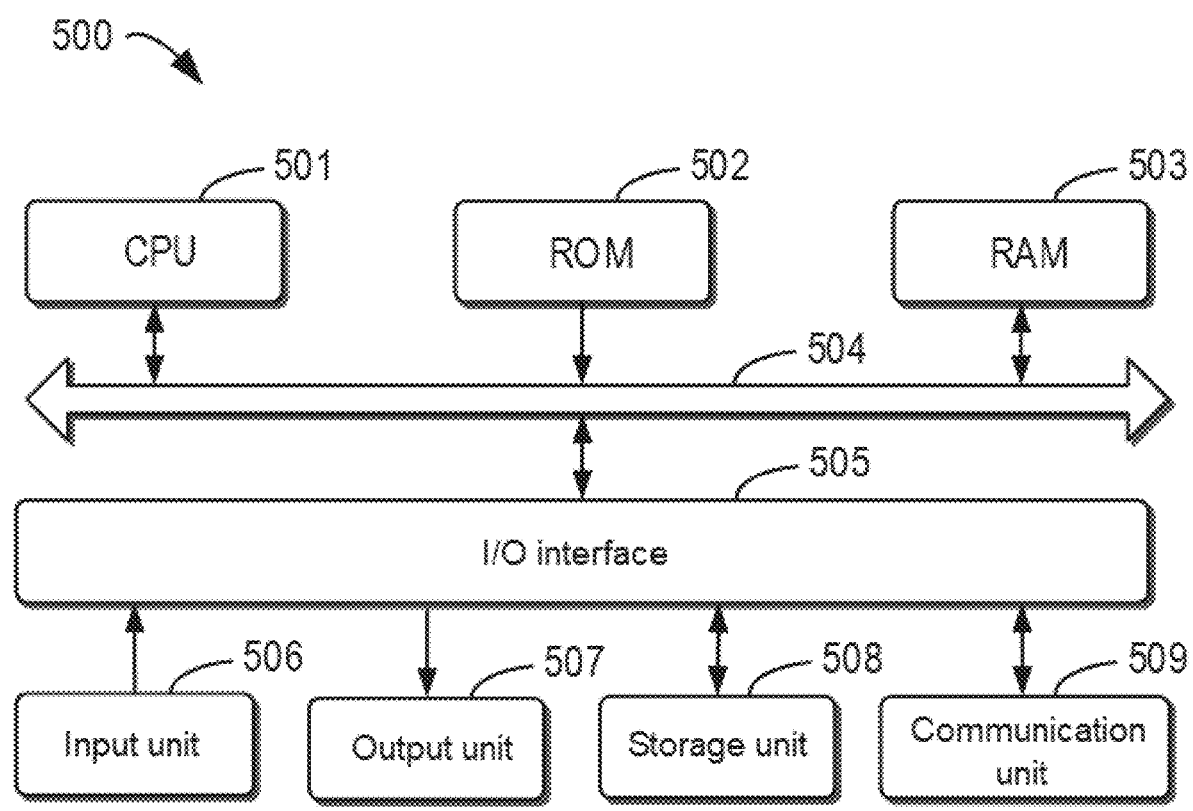
FIG. 5 shows a block diagram of an example device that may be configured to implement an embodiment of the present disclosure.

FIG. 5 shows a schematic block diagram of example device 500 that may be configured to implement an embodiment of content of the present disclosure. For example, data protection device 120 as shown in FIG. 1 may be implemented by device 500. As shown in FIG. 5, device 500 includes CPU 501 that may execute various appropriate actions and processing in accordance with computer program instructions stored in read-only memory (ROM) 502 or computer program instructions loaded onto random access memory (RAM) 503 from storage unit 508. In RAM 503, various programs and data required for the operation of device 500 may also be stored. CPU 501, ROM 502, and RAM 503 are connected to each other by bus 504. I/O interface 505 is also connected to bus 504.

A plurality of members in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

Various processes and processing described above, for example, method 200, may be performed by processing unit 501. For example, in some embodiments, method 200 may be implemented as a computer software program that is tangibly included in a machine-readable medium such as storage unit 508. In some embodiments, some or all of the computer program may be loaded and/or installed onto device 500 via ROM 502 and/or communication unit 509. When the computer program is loaded into RAM 503 and executed by CPU 501, one or more actions of method 200 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A data protection method, comprising:
   determining an object feature for each protection object in a set of protection objects to obtain determined object features, the set of protection objects comprising a protection object configured with a predetermined data protection strategy, wherein the protection object comprises a predetermined attribute, an external attribute, and an internal attribute, wherein the set of protection objects comprises at least one of the following: a virtual machine, a database, a physical device, or a file system, and wherein the predetermined attribute specifies one of an operating system of the protection object, a size of storage devices of the protection object, and a number of processing units of the protection object;
   monitoring the protection object from outside of the operating system of the protection object to obtain the external attribute;
   logging into the operating system of the protection object to obtain the internal attribute;
   training a classification model based on a corresponding object feature of the protection object, wherein the classification model comprises a support vector machine, wherein the object feature of the protection object comprises a plurality of feature items;
   determining, using the classification model, a set of candidate objects belonging to a same class as the protection object according to the determined object feature of the protection object;
   ranking the set of candidate objects according to the plurality of feature items to obtain a set of ranked candidate objects;
   determining at least one candidate object based on the set of ranked candidate objects; and
   configuring the predetermined data protection strategy to include the at least one candidate object.

2. The method according to claim 1, wherein determining the at least one candidate object based on the set of ranked candidate objects comprises:
   providing a user with the set of ranked candidate objects;
   receiving a user selection indicating the at least one candidate object; and
   updating the classification model using the user selection.

3. The method according to claim 1, wherein determining the object feature for each protection object in the set of protection objects comprises:
   clustering the set of protection objects based on a set of attributes of each protection object in the set of protection objects; and
   determining the object feature of each protection object based on the set of attributes and a result of the clustering.

4. A non-transitory computer readable medium comprising instructions which, when executed by a computer processor, enables the computer processor to perform a method, the method comprising:
   determining an object feature for each protection object in a set of protection objects to obtain determined object features, the set of protection objects comprising a protection object configured with a predetermined data protection strategy, wherein the protection object comprises a predetermined attribute, an external attribute, and an internal attribute, wherein the set of protection objects comprises at least one of the following: a virtual machine, a database, a physical device, or a file system, and wherein the predetermined attribute specifies one of an operating system of the protection object, a size of storage devices of the protection object, and a number of processing units of the protection object;
   monitoring the protection object from outside of the operating system of the protection object to obtain the external attribute;
   logging into the operating system of the protection object to obtain the internal attribute;
   training a classification model based on a corresponding object feature of the protection object, wherein the classification model comprises a support vector machine, wherein the object feature of the protection object comprises a plurality of feature items;
   determining, using the classification model, a set of candidate objects belonging to a same class as the protection object according to the determined object feature of the protection object;
   ranking the set of candidate objects according to the plurality of feature items to obtain a set of ranked candidate objects;
   determining at least one candidate object based on the set of ranked candidate objects; and
   configuring the predetermined data protection strategy to include the at least one candidate object.

* * * * *